United States Patent
Fukuda et al.

(10) Patent No.: US 6,578,184 B2
(45) Date of Patent: Jun. 10, 2003

(54) CIRCUIT DESIGN METHOD AND CIRCUIT DESIGN APPARATUS

(75) Inventors: Masanori Fukuda, Takasaki (JP); Hisato Inaba, Takasaki (JP); Hiroaki Sugimoto, Takasaki (JP)

(73) Assignees: Hitachi, Ltd., Tokyo (JP); Hitachi Tohbu Semiconductor, Ltd., Gunma (JP)

(*) Notice: Subject to any disclaimer, the term of this patent is extended or adjusted under 35 U.S.C. 154(b) by 0 days.

(21) Appl. No.: 09/939,590

(22) Filed: Aug. 28, 2001

(65) Prior Publication Data

US 2002/0032896 A1 Mar. 14, 2002

(30) Foreign Application Priority Data

Sep. 14, 2000 (JP) .......................... 2000-279041

(51) Int. Cl.⁷ .............................................. G06F 17/50
(52) U.S. Cl. ................................... 716/13; 716/12
(58) Field of Search ............................ 716/1–14

(56) References Cited

U.S. PATENT DOCUMENTS 4,078,206 A * 3/1978 Crowle ........................ 330/253
6,107,852 A * 8/2000 Durham et al. ............. 327/203

OTHER PUBLICATIONS

VLSI System Design, S. Muroga, John Wiley & Sons, Inc., 1982, pp. 348–351.

* cited by examiner

Primary Examiner—Vuthe Siek
Assistant Examiner—Sun James Lin
(74) Attorney, Agent, or Firm—Mattingly, Stanger & Malur, P.C.

(57) ABSTRACT

Route nets having at least one current path through which a current flows are extracted from among a plurality of route nets each representing a line that interconnects elements of an electronic circuit in electrical connecting relationship from information on an electronic schematic. The extracted route nets is separated into a first subnet of lines where currents flow and a second subnet of lines where no currents flow. A route is determined for each of the first and second subnets. Points on the routes for the first and second subnets are interconnected by another route.

16 Claims, 11 Drawing Sheets

CIRCUIT DESIGN METHOD AND CIRCUIT DESIGN APPARATUS

BACKGROUND OF THE INVENTION

The present invention relates to techniques for designing semiconductor integrated circuits and more particularly to techniques used effectively for designing routes in the semiconductor integrated circuits. Particularly, the present invention relates to techniques used effectively for designing the wiring for interconnection of components that compose an analog circuit built in a semiconductor integrated circuit.

A maze method or a channel allocating method is known as a process for determining routes in a semiconductor integrated circuit in their design. In the maze method, a label "1" is attached to a cell next to a particular cell (starting point) of a matrix corresponding to a line cell; a label "2" to a cell next to the label "1", and so on. In this way, labels are sequentially attached. If a target cell is reached, the successive labels "1", "2", "3" . . . are traced from the beginning to thereby search for the route.

In the channel allocating method, a route is determined for each of wiring areas (channels) provided between cells. This allocating method is used widely in interconnecting of logic gates of a digital circuit. An algorithm for determining a route in the maze method/channel allocating method is disclosed, for example, in S. MUROGA, "VLSI SYSTEM DESIGN", John Wiley & Sons, Inc., 1982, pp. 348–351.

The conventional route determining method is considerably effective for interconnections of logical gates in a digital circuit. To this end, various automatic routing tools (programs) have been provided. For analog circuits, the circuit, characteristics, for example, of an amplifier circuit required by its manufactured article are, however, different from those required by another article. Thus, the circuit compositions vary little by little and the routes must be determined at the respective element levels.

There are a few kinds of such automatic routing tools for analog circuits, but the analog circuits are required to exhibit desired characteristics and sufficient accuracy unlike the digital circuits where timings of signals are dominating. Therefore, the conventional automatic routing tools for the analog circuits have not sufficiently attained a reduction in the number of designs, for example, the user must specify the priority order of determining the route and an outline of the route.

SUMMARY OF THE INVENTION

It is therefore an object of the present invention to provide a route design method reduced in man-hours of design suitable for an automatic wiring design of an analog circuit.

An object of the present invention is to provide a circuit design supporting tool (program) that reduces the man-hours of design in the design of routes in an analog circuit to thereby enable the user to design the routes efficiently.

Another object of the present invention is to provide a circuit design supporting apparatus that reduces the man-hours of design in the design of routes in the analog circuit to thereby enable the user to design the routes efficiently.

Still another object of the present invention is to provide a circuit design apparatus capable of reducing the number of designs in the route design of an analog circuit and enabling the user to perform the route design.

These and other objects and novel features of the present invention will be obvious from the description of this specification and the accompanying drawings.

In order to achieve the above objects, according to one aspect of the present invention, there is provided a method or program of designing, or supporting the design of, a circuit comprising the steps of:

inputting information on a schematic representing a circuit comprising a plurality of elements and a plurality of lines that interconnects respective terminals of the plurality of elements, and a value of a power supply voltage fed through a particular one of the plurality of lines that interconnect the respective terminals of the plurality of elements;

detecting a path through which an electrical current flows in the circuit based on the inputted information on the schematic;

extracting routing nets each of which comprises a route through which an electrical current flows from among routing nets each comprising at least one line that interconnects terminals of ones of the plurality of elements in electrical connecting relationship from the inputted information on the schematic;

separating each of the extracted routing nets into a first subnet comprising a line through which an electrical current flows and a second subnet through which no electrical current flows; and generating a constraint condition by which a route is determined for each of the first and second subnets.

According to the above method or program, each of the extracted routing nets is separated into the first subnet comprising a line through which an electrical current flows and the second subnet through which no electrical current flows, and a route is determined for each of the first and second subnets. Thus, the route is determined efficiently in the automatic routing design and the time required for the route design is reduced.

When the plurality of elements of the circuit comprise a bipolar transistor, the path detecting step or function is performed by assuming that no electrical current flows into the bipolar transistor through its base terminal. Thus, since the number of paths in the designed circuit through which the electrical currents flow is limited, the route determining algorithm is simplified to thereby determine the route efficiently. Even when such assumption is made, the determined route does not greatly affect the characteristics of the circuit because the base current is by far small compared to the collector current.

Preferably, when the first and second subnets are interconnected, the constraint condition generating step comprises generating a constraint condition that prevents a current, which would otherwise flow due to interconnection of the first and second subnets, from flowing through the second subnet. Thus, the automatic routing process performs a route design that prevents an electrical current from flowing through an undesirable path.

The schematic information inputting step or schematic information input supporting function may comprise inputting data that specifies a pair of elements among the plurality of elements of the circuit. When a required accuracy of the circuit is high, the constraint condition generating step or function may comprise interconnecting the route for the first subnet to a midpoint of the route for the second subnet that interconnects terminals of the pair of elements corresponding to each other. Thus, the automatic route design is made which prevents the voltages on the pair of elements from becoming imbalanced.

The schematic data inputting step may comprise inputting data specifying a pair of elements among the plurality of elements of the circuit and data specifying the accuracy of the pair of elements. When accuracy of the pair of elements is inputted or when the inputted accuracy is higher than a predetermined value, the constraint condition generating step may comprise connecting a midpoint of a line of the first subnet that interconnects the terminals of the pair of elements corresponding to each other with a line of another subnet. Thus, a design of a different required accuracy is possible for each pair of elements to thereby provide a circuit of increased accuracy.

The midpoint of the route for the subnet may be at equal distances from a contact point where the route is interconnected to the first terminal and another contact point where the route is interconnected to the second terminal. Thus, the automatic routing is made which prevents the voltages on a more accurate pair of elements from becoming imbalanced.

The use of the above-mentioned method or program in the route design for the analog circuit serves to decrease the man-hours of design and to do efficient designing work.

According to another aspect of the present invention, there is also provided a circuit designing apparatus comprising:

a storage device in which the circuit design supporting program of the invention is stored;

a computer for reading the program from said storage device and for executing the program;

an input device for inputting required data to said computer; and a display device for displaying a schematic whose data is inputted by said input device.

According to such circuit designing apparatus, especially, efficient analog circuit design is achieved which is accomplished in a minimum of man-hours of design.

DESCRIPTION OF THE EMBODIMENTS

Embodiments of the present invention will be described with respect to the accompanying drawings.

Figure 1:
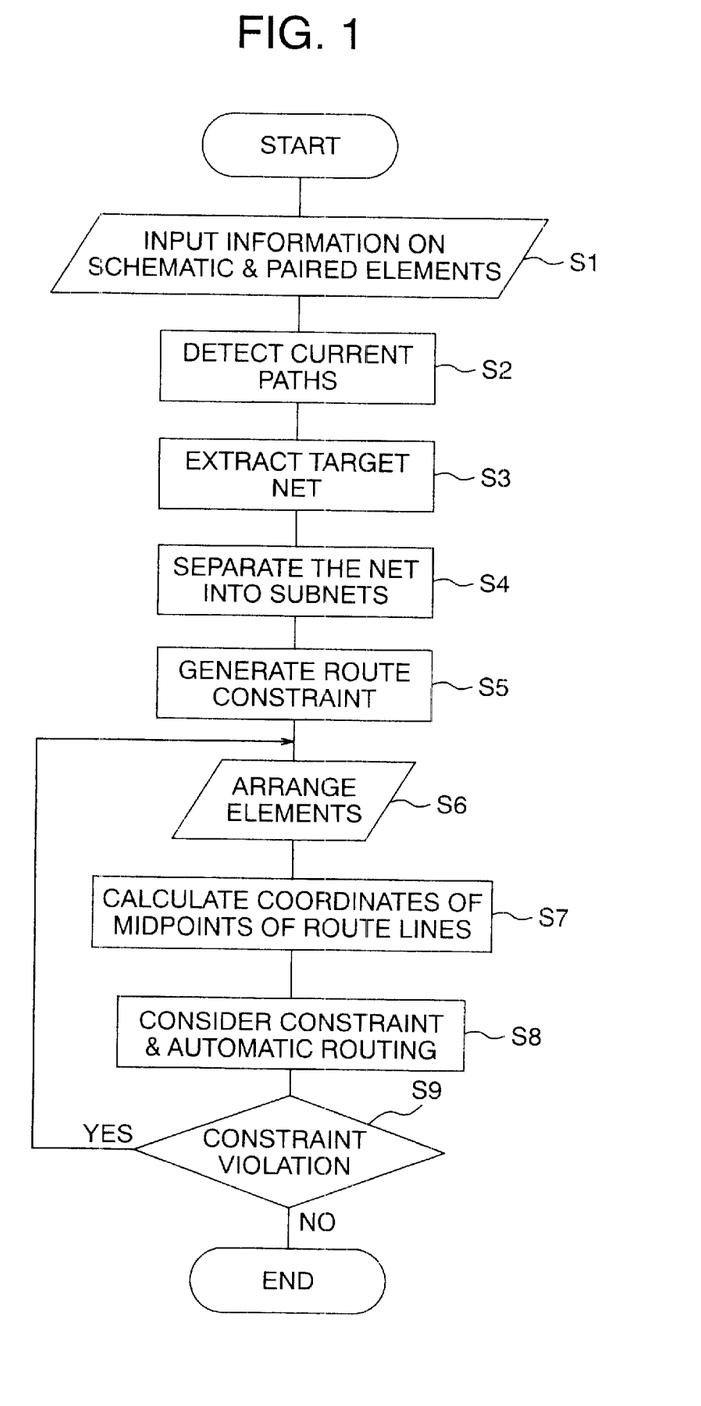
FIG. 1 is a flowchart of a process for designing a route of an analog circuit according to the present invention.

FIG. 1 is a flowchart indicative of a route designing method for an analog circuit according to the present invention. In this method, a user or a designer views a picture displayed on a display device of a computer while inputting data on a schematic, selecting a pair of elements, and specifying a power supply line and voltage relationship data (step S1). The pair of elements will be described in greater detail later. When the schematic data is inputted, a parts list PTL is displayed in a portion (on the right side) of a picture, for example of FIG. 2, using a work list OPL displayed on the left side of the picture. A desired part or element is selected with a mouse in the list and disposed in a work area at the center of the picture. The user instructs the computer to depict wiring for interconnection of the elements.

Figure 2:
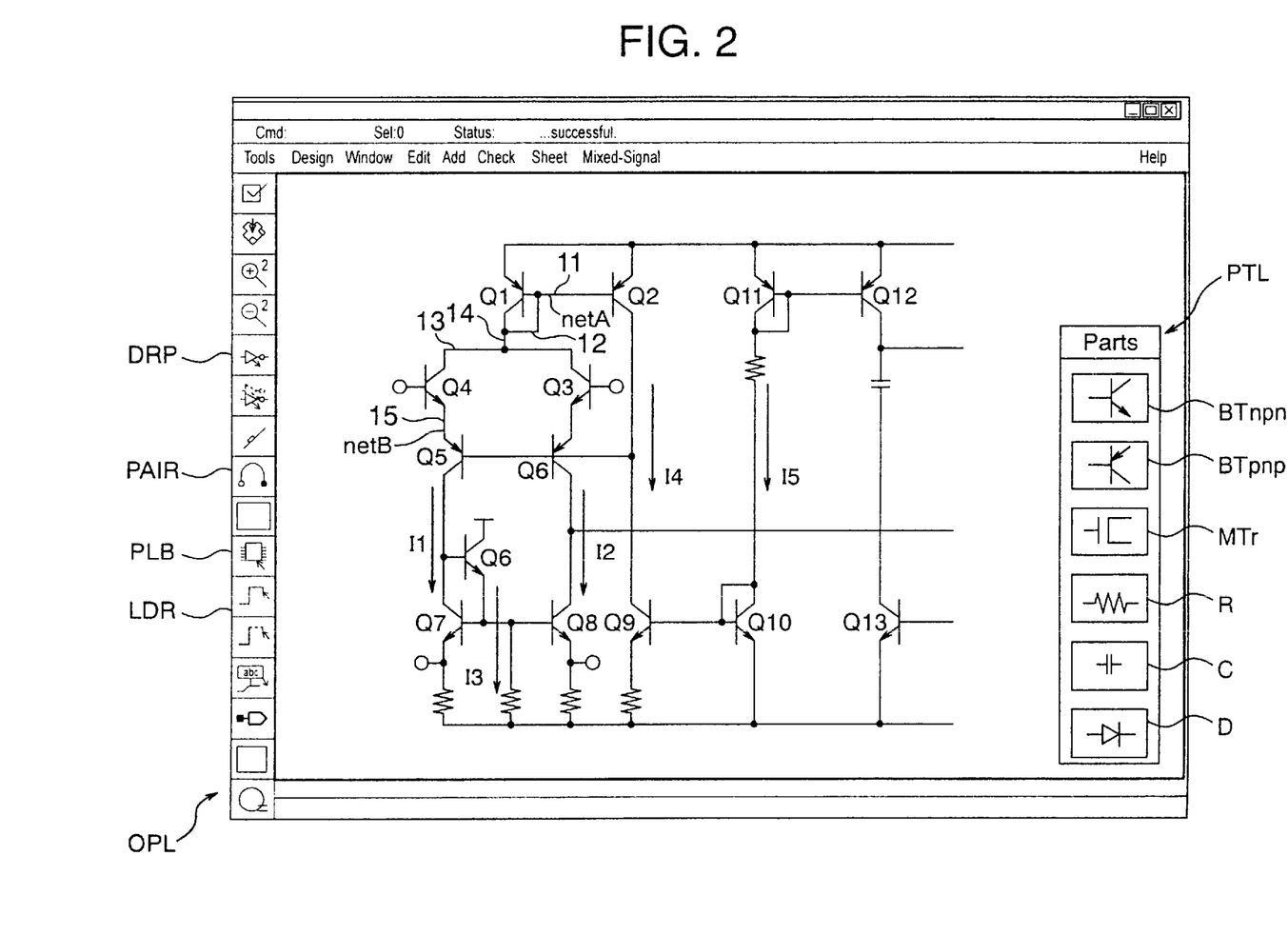
FIG. 2 illustrates an input picture of a schematic to be used in the design method according to the present invention.

More specifically, first, a parts-list display button PLB is first clicked in the work list OPL to display a window of the parts list PTL that indicates arrangement of elements such as bipolar transistors BTnpn, BTpnp, a MOS transistor MTr, a resistor R, a capacitor C, a diode D, etc., that compose the analog circuit. A desired element is then selected in the parts list PTL by manipulating the mouse to cause its pointer to point to a button with a symbol representing the desired element to be used and by clicking the button. A button DRP that indicates arrangement (drop) is then clicked in the work list displayed on the left side of the picture to thereby display the symbol of the element on the work area of the picture. The pointer is then caused to point to the symbol, and the symbol is then dragged and dropped at any particular position.

A button LDR indicative of interconnection line drawing is then clicked in the work list OPL displayed on the left side of the picture to thereby specify an interconnection line drawing mode. A line that interconnects a terminal of any element displayed in the work area and a terminal of another desired element is drawn by manipulating the mouse to move its pointer on the picture. If a straight or zigzag line is to be depicted at this time, such line is adapted to be drawn automatically by specifying its starting and end points or a turning in the line. By repeating such work, the schematic of FIG. 2 is inputted.

Tools (programs) that support the above work have been supplied by a plurality of EDA (Engineering Design Automation) vendors. For example, one of the tools is "Composer" manufactured by CADENCE. A wiring net produced by one of the schematic input support tools which are provided by the EDA vendors is available for the present invention.

In addition to the above functions, the schematic input support tool used in the present invention may further have the functions of specifying, recognizing and displaying any two elements as a pair of elements in the schematic displayed in the work area. To realize these functions, a button PAIR that specifies a pair of elements may be provided in the work list OPL displayed on the left side of the picture.

The "pair of elements" in the specification and attached claims points to a pair of elements matching in relative accuracy because the relative accuracy of the pair of elements affects the circuit characteristics, as in the case of a pair of differential input transistors in a differential amplifier. More specifically, in the circuit of FIG. 2, the pair of elements are a pair of transistors Q1 and Q2; Q9 and Q10; and Q11 and Q12 with the base electrodes of each of the pairs of transistors being interconnected to each other to compose a current mirror circuit: a pair of input differential transistors Q3 and Q4 whose emitter electrodes are interconnected to each other to compose a differential circuit: a pair of transistors Q5 and Q6 whose base electrodes are interconnected to each other to provide a level shift function: and a pair of transistors Q7 and Q8 whose base electrodes are interconnected to each other to provide a constant current source.

Figure 3:
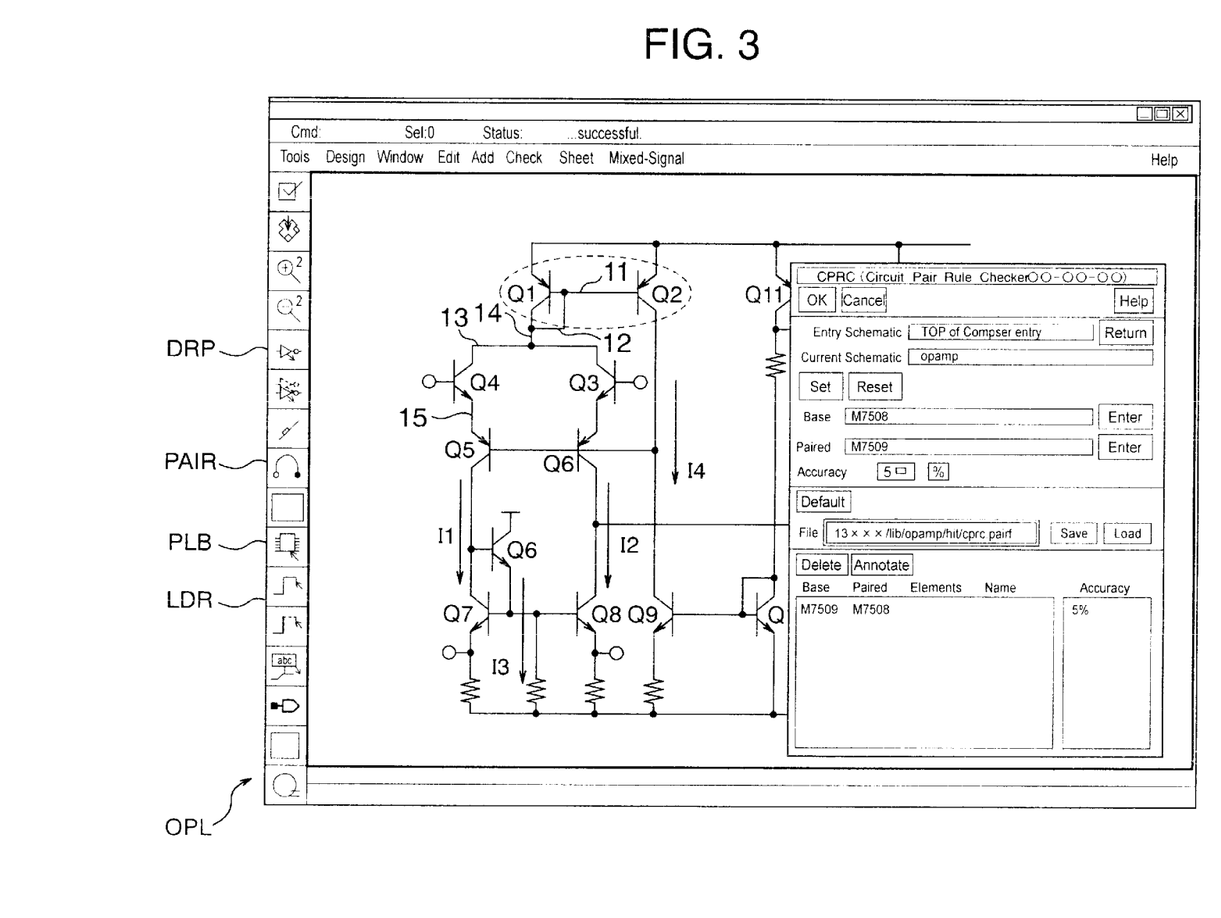
FIG. 3 illustrates a pair input form displayed when a pair of elements is specified in an input picture of a schematic to be used in the design method according to the present invention.

In order to input a pair of elements data, the user first clicks the pair specifying button PAIR with the mouse. In response, as shown in FIG. 3, a pair input form PIF is displayed on the picture in the form of a window. The user then clicks one of the elements to be paired on the work area (schematic) of the picture, using a pointer of the mouse, to select it as a reference element. The user then clicks a "Base-" button in the pair input form PIF. In response, the name of the element (an identification symbol given beforehand when the circuit data was inputted) selected by the clicking is displayed in a reference-element entry column indicated as "Base".

The user then clicks another element to be paired with the reference element, using the mouse pointer, on the work area (schematic) in the picture and further clicks the "Paired-[Enter]" button in the pair input form PI. In response, the name of the clicked element is displayed in the pair of elements column indicated as "Paired", and selectable pair accuracies are indicated in an "Accuracy" column. The user selects a desired one from among the pair accuracies. The "pair accuracy" represents in percentage a tolerance of deviation of a terminal voltage of each of a pair of elements.

The user then clicks a "Set" button in the pair input form PIF. In response, the input support tool recognizes that the specified two elements are paired. Information indicating that the specified two elements are paired is then displayed in a field "Pair List" of the pair input form PIF and a broken-line ellipse P that surrounds the two elements is shown, for example, by P in FIG. 3 to clearly indicate that the two elements are paired in the schematic of the picture. The user then clicks a "File-" button in the pair input form PIF to thereby store the information on the paired elements in a predetermined file in a storage device of the system and to terminate the paired-elements specifying process.

In addition to the above functions, the schematic input support tool used in the present invention has the function of recognizing the flowing direction of the current when the power supply line is specified in the schematic displayed in the work area and voltage relationship data is inputted. In order to realize this function, a button VPS that inputs voltage relationship data is provided in the work list OPL displayed on the left side of the picture. In order to cause the support tool to recognize the flowing direction of the current, a line that composes the power supply line is first clicked by the mouse in the schematic and the button VSP is then clicked. In response, a window appears on the picture, so that when a value of the power supply and calculation expressions are inputted, the support tool recognizes the voltage relationship data, and detects the flowing route and direction of the current in the drawn schematic (step S2). Although the detected flowing route and direction of the current are not displayed in the system of this embodiment, they can be displayed by arrows and reference numerals I1–I5 in FIGS. 2 and 3.

In order to realize the above functions easily, it should be beforehand defined, for example, that a bipolar transistor allows a current to flow between its collector and emitter; that a MOS transistor allows a current to flow between its source and drain but does not allow a current to flow between its gate and each of its source and drain; that a resistor allows a current to flow from its higher potential to a lower one; that a capacitor does not allow a (direct) current to flow therethrough; and that a diode allows a current to flow therethrough only in the forward direction. In addition, the support tool should have the function of tracing the power supply line and the lines connected to the power supply line, and sequentially searching for paths through which currents flow from the higher power supply voltage to the lower one.

The feature of the present invention lies in the fact that no current, i.e., a 0 base current, flows between the base and the collector and between the base and the emitter of the bipolar transistor being given as a definition or condition (hereinafter referred to as a "fictitious definition") in the support program. This causes the number of paths through which currents flow to be limited in the schematic to be designed. Thus, an algorithm that determines routes in an analog circuit to be described below is simplified to thereby determine the target routes efficiently. Although the fictitious definition is given, the determined routes do not greatly influence the characteristics of the circuit. This is because even though routes are determined by disregarding the base current the wiring does not greatly influence the circuit characteristics since the base current is smaller than the collector current by two or three orders of magnitude. This is also because when high accuracy is required, it can be brought about by giving a constraint of midpoint interconnection, as will be described in step S5 later.

In step S3, a net having two or more terminals through which no currents flow and having the current path detected in step S2 is extracted as a one to which a constraint should be added in automatic routing. This is also performed automatically by the support tool. As shown by a thick line in FIG. 4, the extracted net is highlighted so as to be distinguished from other nets.

The "net" referred to here is a term used generally in the route design, and points to one or more lines (branch-like wiring) that interconnect terminals of elements placed in electrical connecting relationship, that is, a series of lines placed at the same voltage level when the elements have terminals interconnected to each other and no currents flow through the terminals. More specifically, for example in FIG. 2, one net comprises a combination of a line 11 that interconnects the base terminals of the transistors Q1 and Q2, a line 12 that interconnects the base and collector electrodes of the transistor Q1, a line 13 that interconnects the collector electrodes of the transistors Q3 and Q4, and a line 14 that interconnects the line 13 and the collector electrode of the transistor Q1. If this net is called a net A, the net can be expressed as net A=(Q1-B, Q2-B, Q1-E, Q3-C, Q4-C). A line 15 itself that interconnects the emitter electrodes of the transistors Q4 and Q5 themselves composes a net. If this net is called a net B, the net can be expressed as net B=(Q4-E, Q5-E).

When the target net is extracted in step S3, the extracted net is separated automatically by the support tool into a subnet of lines where corresponding currents flow and a subnet of lines where no corresponding currents flow. Although there has been in the past the concept that a net is separated into a plurality of subnets in the automatic routing design in the past, the concept that a net is separated into a subnet where currents flow and a subnet where no currents flow is created for the first time by the present invention as far as the inventors know. In the present invention, the net where the base current flows in the bipolar transistor is classified as the "subnet where no currents flow" in the routing design process as far as the circuit is concerned. This subnet separation can be expressed, for example, as net A=((Q1-B, Q2-B), (Q1-E, Q3-C, Q4-C)).

One example of the subnet separation is shown in FIGS. 5A–5D, which shows that the base electrodes of transistors Q23 and Q24 are connected to the junction point of series connected transistor Q21 and Q22 wherein the transistors Q23 and Q24 are paired so that these transistors have the same base-emitter voltage Vbe.

Figure 5A:
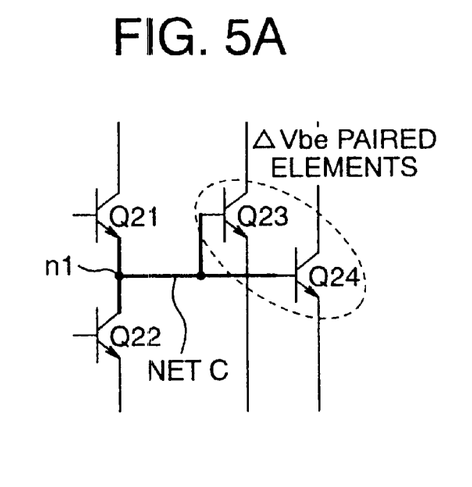
FIGS. 5A–5D illustrate one example of subnet division to be performed in the design method according to the present invention.
Figure 5B:
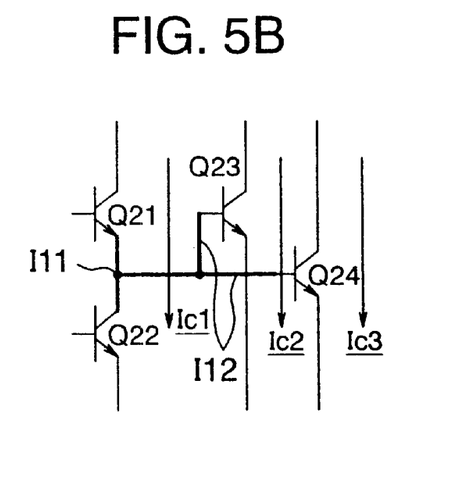
Figure 5C:
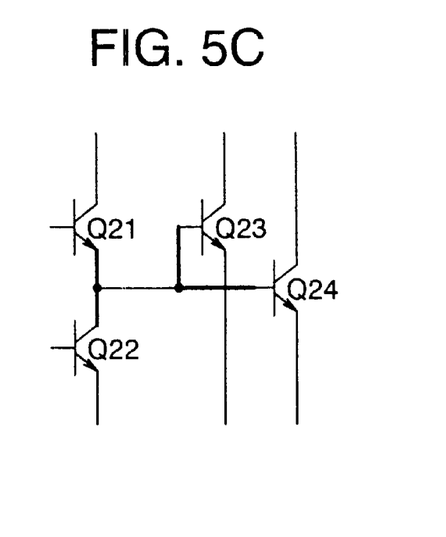

Note a thick-line net C that interconnects the emitter electrode (Q21-E) of the transistor Q21, the collector electrode (Q22-C) of the transistor Q22, the base electrode (Q23-B) of the transistor Q23, and the base electrode (Q24-B) of the transistor 24 in FIG. 5A. The net C can then be expressed as net C=(Q21-E, Q22-C, Q23-B, Q24-B). As shown in FIG. 5B, a collector current Ic1 flows through the transistor Q21-Q22, 50 that a line (Q21-E, Q22-C) I11 that connects the emitter electrode of the transistor 21 to the collector electrode of the transistor Q22 is classified as a "subnet where a current flows". Although collector currents Ic2 and Ic3 flow through the transistors Q23 and Q24, respectively, no current flows through a line (Q23-B, Q24-B) I12 that interconnects the base electrodes of the transistor Q23 and Q24. Thus, the line I12 is classified as a "subnet where no current flows". Thus, the net C of the FIG. 5A circuit can be separated into two subnets shown by thick lines in FIG. 5C. This subnet separation may be expressed as net C=((Q21-E, Q22-C), (Q23-B, Q24-B)).

Figure 6A:
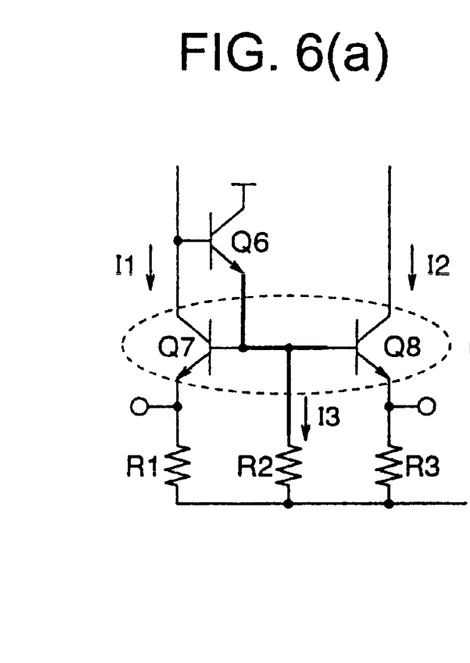
FIG. 6 illustrates another example of subnet division to be performed in the design method according to the present invention.

FIG. 6 shows another example of the subnet separation. The circuit of FIG. 6A shows the transistors Q7 and Q8 of the FIG. 2 circuit having base electrodes interconnected to each other, the transistor Q6 that provides a base voltage potential of the transistors Q7 and Q8, and resistors R1, R2 and R3 interconnected between the respective emitter electrodes of the transistors Q6, Q7 and Q8 and ground. In this circuit, the transistors Q7 and Q8 are paired so as to have the same base-emitter voltage Vbe.

Figure 6B:
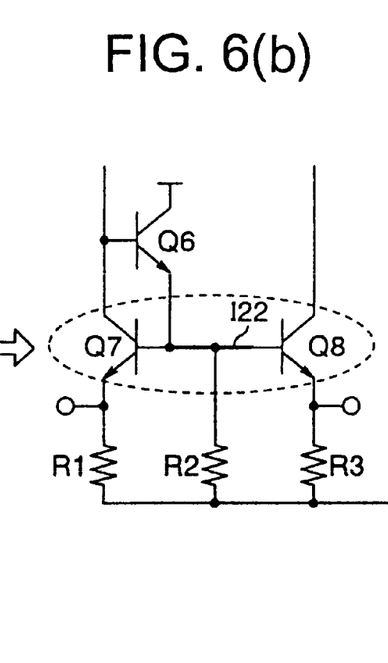
Figure 6C:
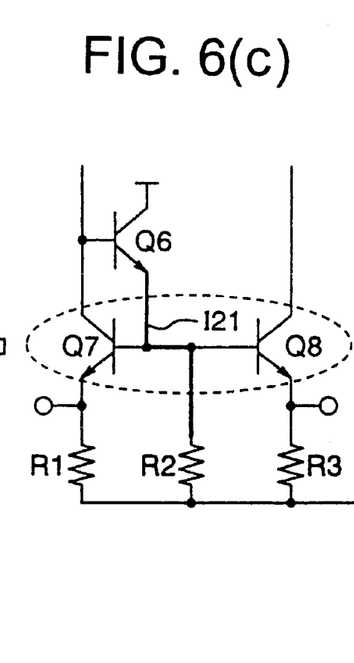

Note a thick-line net that interconnects the emitter electrode of the transistor Q6 and the base electrodes of the transistors Q7 and Q8. As shown in FIG. 6B, a current I3 flows from the transistor Q6 to the resistor R2. Thus, a line I21 that interconnects the emitter electrode of the transistor Q6 and the resistor R2 is classified as the "subnet where a current flows". Since no current flows through a line I22 which interconnects the base electrodes of the transistors Q7 and Q8 although collector currents I1 and I2 flow through the transistors Q7 and Q8, the line I22 is classified as the "subnet where no current flows". Thus, a line I21 that interconnects the emitter electrode of the transistor Q6 and the resistor R2 is classified as the "subnet where a current flows". Thus, the net of the FIG. 6(a) circuit is separated into two subnets as shown respectively by thick lines in FIGS. 6B and 6C.

Referring back to FIG. 1, when the target net is separated into the subnets, in step S5 a routing constraint is generated, which comprises (1) determining routes for the "subnet where no currents flow" and the "subnet where currents flow" by regarding them as separate nets, and interconnecting the subnets; (2) seeing that no currents flow through the "subnet where no currents flow" when the subnets are interconnected; or (3) selecting inter-midpoint interconnection of the subnets when high accuracy is required for the circuit and any-point interconnection where no interconnection position is specified when no high accuracy is required. The above routing constraint (3) may be inputted by the user at the keyboard. For all pairs of elements, the constraint to select inter-midpoint connection automatically may be generated. The constraint (2) about the interconnection between the subnets is specifically that at least a part of a route corresponding to the "subnet where currents flow" does not overlap with a route corresponding to the "subnet where no currents flow". In the example of FIG. 6, the route corresponding to the "subnet where no currents flow" (FIG. 6B) intersects at one point with the route corresponding to the "subnet where currents flow" (FIG. 6C).

Figure 5D:
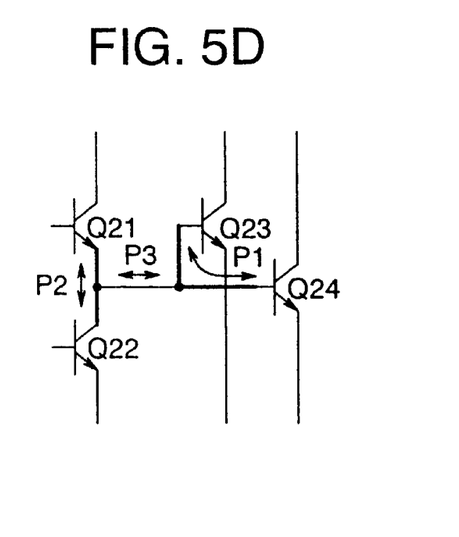
Figure 7A:
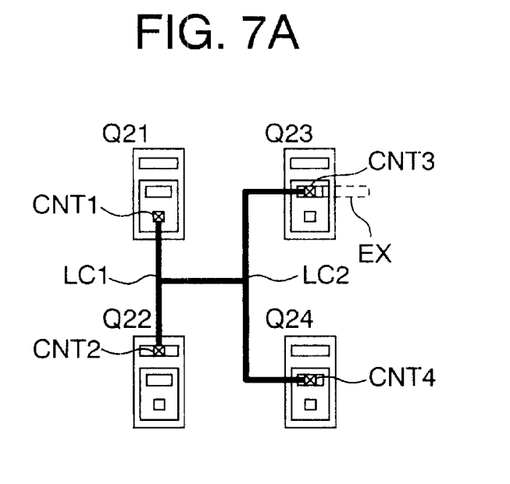
FIGS. 7A–7D each illustrate a layout of a pattern of a route to be disposed by automatic routing design based on a schematic.

For example, as shown in FIG. 5D, in the circuits of FIGS. 5A–5D the routing constraint comprises determining a path of the line P1 that interconnects the base electrodes of the transistors Q23 and Q24, a path of the line P2 that interconnects the emitter and collector electrodes of the transistors Q21 and Q22, and a path of the line P3 that interconnects the two routes. In addition, the constraint ② is satisfied only by interconnecting any points on the respective subnets in the circuit of FIGS. 5A–5D. At this time, when the constraint of the midpoint interconnection ③ is generated, a route is determined which interconnects midpoints LC1 and LC2 of the respective routes, as shown in FIG. 7A.

The midpoint points out a midpoint of a line extending between contact holes in terminals of the two elements, and not a midpoint between opposite ends of the line itself. In an example of FIG. 7A, the midpoint points out a midpoint LC1 of a line extending between contact holes CNT1 and CNT2 of the transistors Q21 and Q22, and a midpoint LC2 of a line extending between contact holes CNT3 and CENT of the transistors Q23 and Q24. Even if the line extends through the contact hole, as shown by EX in FIG. 7A, the position of the contact hole should be eventually handled as the end of the line.

Figure 7B:
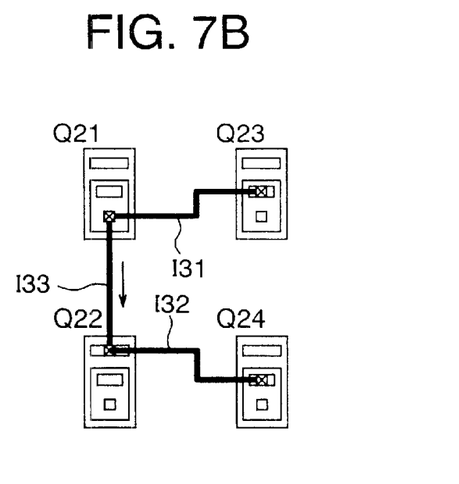

If there is no constraint of the subnet separation (1), a separate line interconnects a line I31 that interconnects the collector and base electrodes of the transistors Q21 and Q23., and a line I32 that interconnects the collector and base electrodes of the transistors Q22 and Q24, respectively, are connected by a separate line as shown in FIG. 7B in automatic routing in later step S8 (FIG. 1). In this case, since a current flows through a line I33 that interconnects the collector and emitter electrodes of the transistors Q21 and Q22, respectively, a voltage drop occurs across the line I33 to thereby cause the base voltage levels of the transistors Q23 and Q24 to deviate by the voltage drop, which influences the circuit characteristic. Thus, in this case, the constraint of the subnet separation is effective.

Figure 7C:
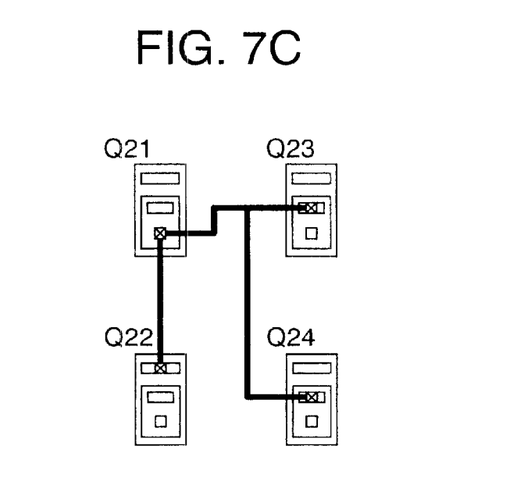

If there is no constraint of the midpoint interconnection ③, it is possible to determine different routes extending between the transistors Q21 and Q23 and between the transistors Q21 and Q24, respectively, as shown in FIG. 7C. The reason why the routes of FIG. 7C are determined is that it is assumed that no current flows into the bipolar transistor through its base when the current direction is detected in step S2. Since the line extending between the collector electrode of the transistor Q21 and the base electrode of the transistor Q23. differs in length from the line extending between the collector electrode of the transistor Q21 and the base electrode of the transistor Q24 in FIG. 7C, there occurs a difference between the base voltage levels of the transistors Q23 and Q24 when the base currents flow into the transistors Q23 and Q24. If the transistors Q23 and Q24 are paired, their respective circuit operations are unbalanced to thereby deteriorate the circuit characteristics. Thus, by giving the constraint of the midpoint interconnection ③, such deterioration in the circuit characteristics is avoided.

Referring back to FIG. 1, when the routing constraint generating process in step S5 ends, an element arranging process in step S6 is performed. In this process, the user views a picture on the display of the computer while manipulating the mouse or the keyboard to specify the position of an element on the chip. The input picture about the element arrangement has a composition similar to that of the schematic input picture in FIG. 2. In the former picture or in a predetermined one of two pictures displayed simultaneously in a multi-window display system, the user arranges desired elements in a work area of the predetermined picture while viewing the schematic picture and using the parts and work lists.

Figure 8A:
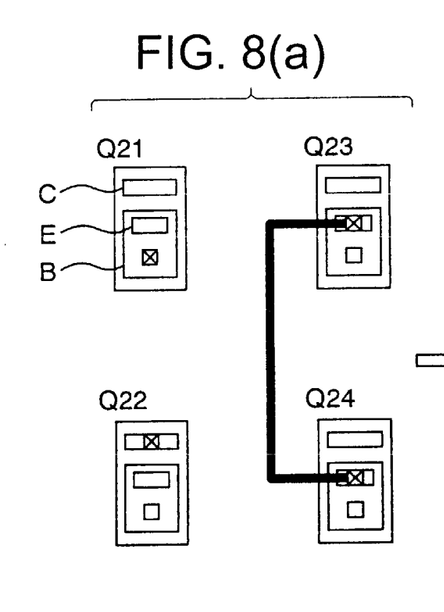
FIG. 8 is a sequence of layouts indicative of a process for producing a route pattern to be disposed in an automatic routing design based on subnet division and generation of a routing constraint to be performed in the inventive design method.

Thus, for example, as shown in FIG. 8A, arrangement of the transistors Q21, Q22, Q23, Q24, . . . is determined. Such process can be performed efficiently, by using an appropriate one of layout tools (programs) that support such work, available from a plurality of EDA vendors. "Virtuoso-XL" available from CADENCE has a similar function.

After the arrangement of the elements ends, the routing constraints generated in step S5 are checked for any inter-midpoint interconnection constraint. If there is this constraint, the respective coordinates of the midpoints of the subnet routes are calculated (step S7). When a new routing constraint is generated by the arrangement of the elements, the routing constraints may be updated so as to include the new constraint additionally.

Figure 8B:
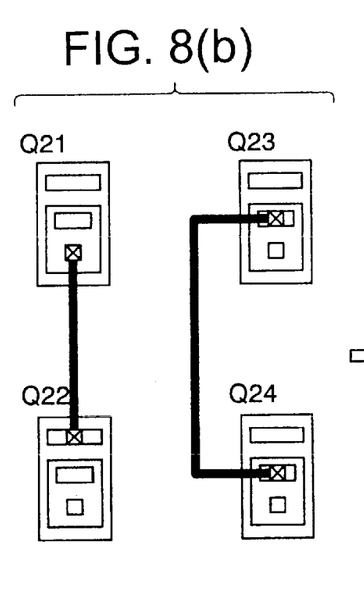
Figure 8C:
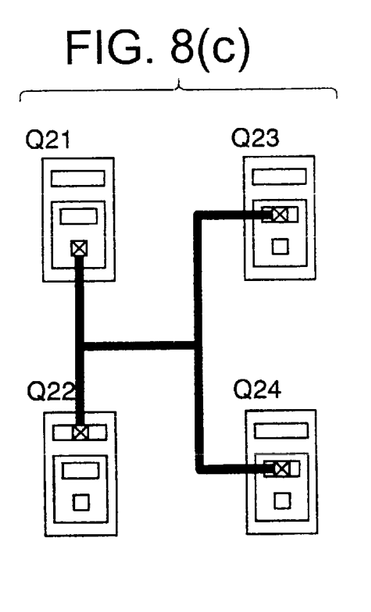

After the work, the schematic data and the routing constraints generated in steps S1–S5 and S7 are transferred to the layout tool to cause the layout tool to perform automatic wiring in consideration of the constraints (step S8). In the present invention, when, for example, the routes in the FIG. 5 circuit are designed in the automatic routing in step S8, the routes in the two subnets are separately determined, as shown in FIGS. 8A and 8B, and then a route that interconnects the two subnets is added. At this time, inter-midpoint interconnection is performed, using the coordinates of the midpoints of the subnet routes calculated in step S7, when the constraint (3) is included, and a route layout of FIG. 8C is determined. Note that reference characters C, B and E in FIG. 8A denote the collector, base and emitter areas, respectively, of the bipolar transistor Q2 as well as the corresponding collector, base and emitter areas, respectively, of each of other transistors Q22, Q23 and Q24 of FIGS. 8B and 8C.

Figure 4:
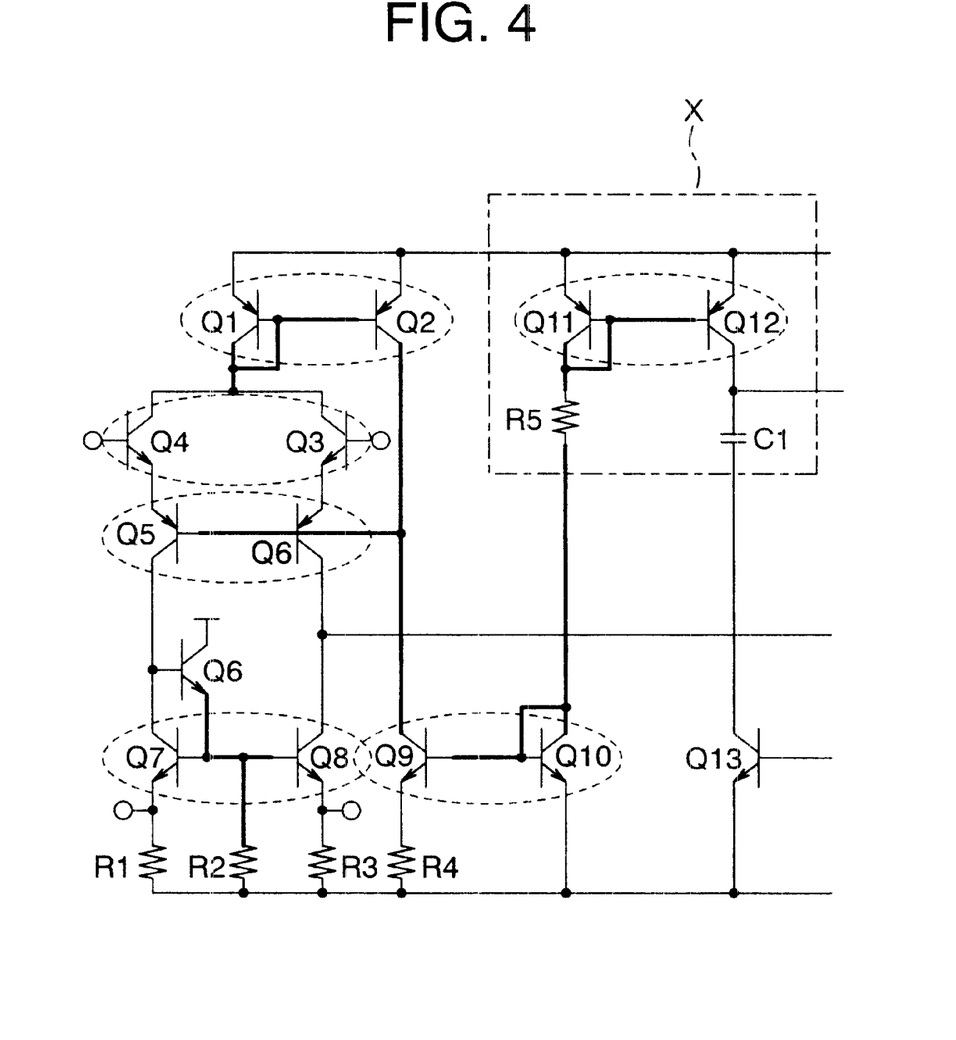
FIG. 4 is a schematic of an analog circuit as one example of a circuit to be designed in the design method according to the present invention.
Figure 9A:
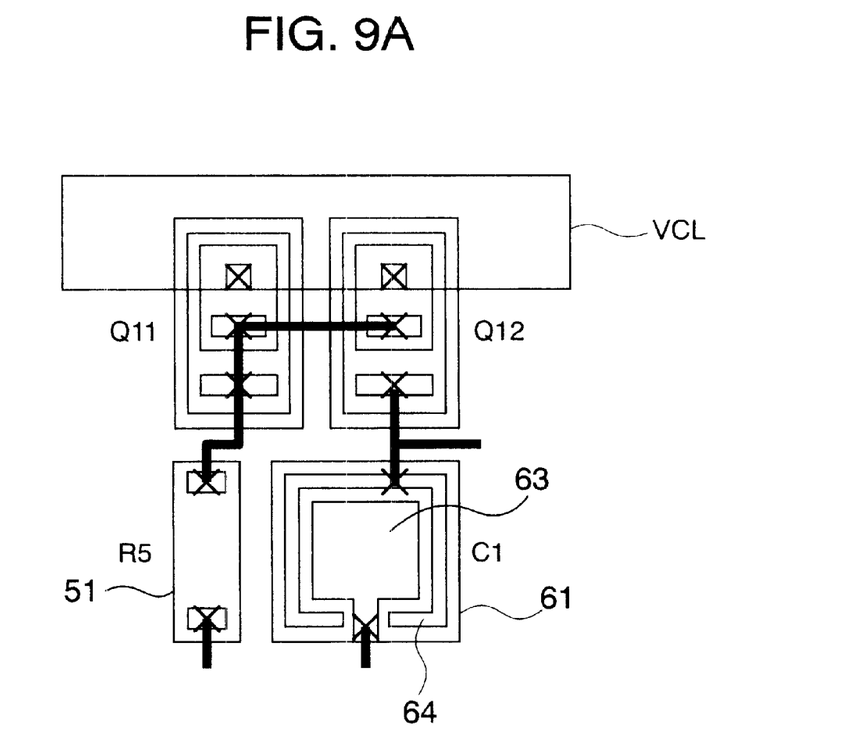
FIGS. 9A and 9B are a layout of transistors Q11 and Q12, a resistor 5 and capacitance C1 and lines extending among them in FIG. 4, and a cross-sectional view of the capacitor structure, respectively.
Figure 9B:
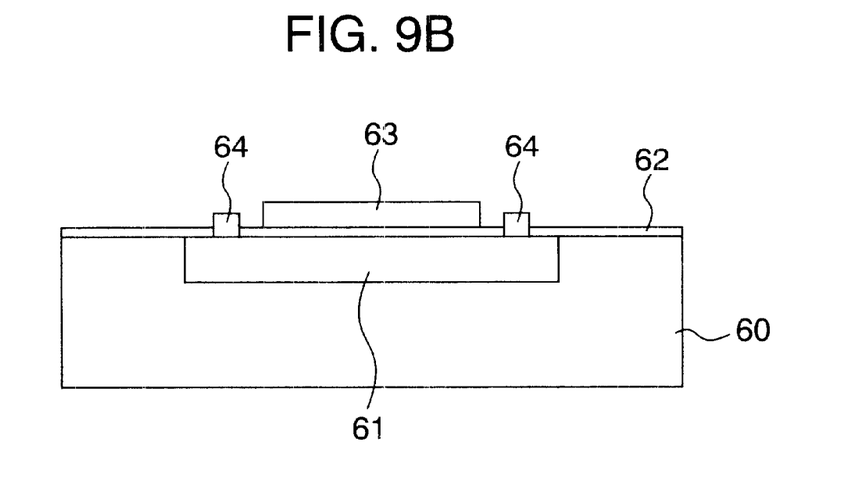

FIG. 9A illustrates the transistors Q11, Q12, resistor RS and capacitance C1 surrounded by a chain line X in FIG. 4 and a wiring layout. In FIG. 9A, reference symbol VCL denotes a power supply line that supplies a power supply voltage Vcc. The resistor R5 is made, for example, of a diffusion layer formed on a semiconductor substrate or a polysilicon layer formed through an insulating film on a semiconductor substrate. Reference numeral 51 denotes an outline of the diffusion layer or polysilicon layer. For example, as shown in FIG. 9B, the capacitance C1 involves an insulating film 62 formed between a diffusion layer 61 which is, in turn, formed on the semiconductor substrate 60 and an electrode 63 as one terminal of the capacitance C1 made of aluminum formed on the insulating film 62. Reference numeral 64 denotes an electrode as another terminal of the capacitance C1 interconnected to the diffusion layer 61 and formed so as to surround the electrode 63.

If there is a violation of the constraints and this cannot be avoided, the layout tool used in step S8 determines the routes by disregarding the constraint and displays on the picture that there was the violation of the constraint to thereby prevent the automatic routing process from stopping due to the inability to avoid the violation of the constraints that would otherwise occur.

In step S9 the user checks a result of the automatic routing for a violation of the constraints with the aid of the layout tool. If there is a violation of the constraints, the control returns to step S6 to change the arrangement of the elements, and to cause the layout tool to again perform automatic routing. When the violation of the constraints disappears, the route design is completed.

Figure 7D:
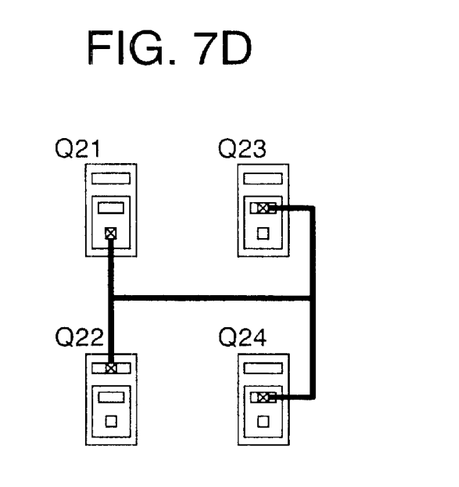

In the three constraints ①–② illustrated when the routing constraints were generated, an layout, for example, of FIG. 7D can occur in which the route that interconnects the base electrodes of the transistors Q23 and Q24 is symmetrical with reference to a line that interconnects the base electrodes of the transistors Q23 and Q24 of FIG. 7A. Since such layout produces no imbalance between the pair of elements, no great problem arises in the circuit characteristic. In such a case, the condition that a route for a target subnet should be provided on its side nearer a subnet to be interconnected to the target subnet is not added as a constraint in the present embodiment.

It will be seen in the comparison between FIGS. 7A and 7D that the layout of FIG. 7A is preferable compared to that of FIG. 7D because the former is shorter in wiring. Thus, of course, the above condition may be added as the constraint. As the number of constraints increases, however, a time required for the automatic routing process in step S8 increases and the number of violations of the constraints increases. Thus, by reducing the number of constraints as in the embodiment, the time required for the automatic routing process is reduced.

While the route design method in the circuit where the bipolar transistors are used as active elements has been illustrated, the present invention is applicable to a route design for the circuits where MOS transistors are used as active elements.

Figure 10A:
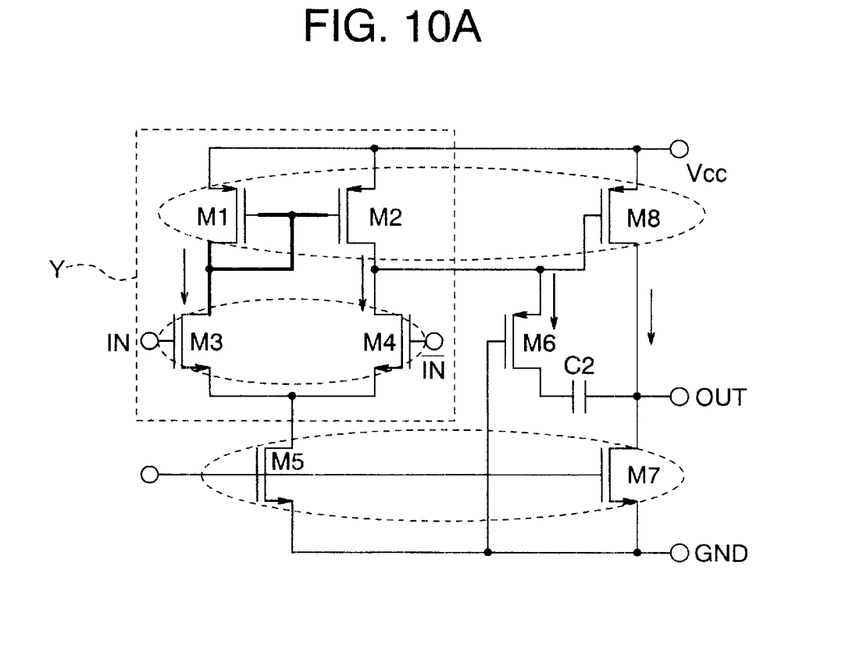
FIGS. 10A and 10B are a schematic of a MOS circuit as one example of a circuit designed in the inventive design method, and a layout of several elements of the circuit.
Figure 10B:
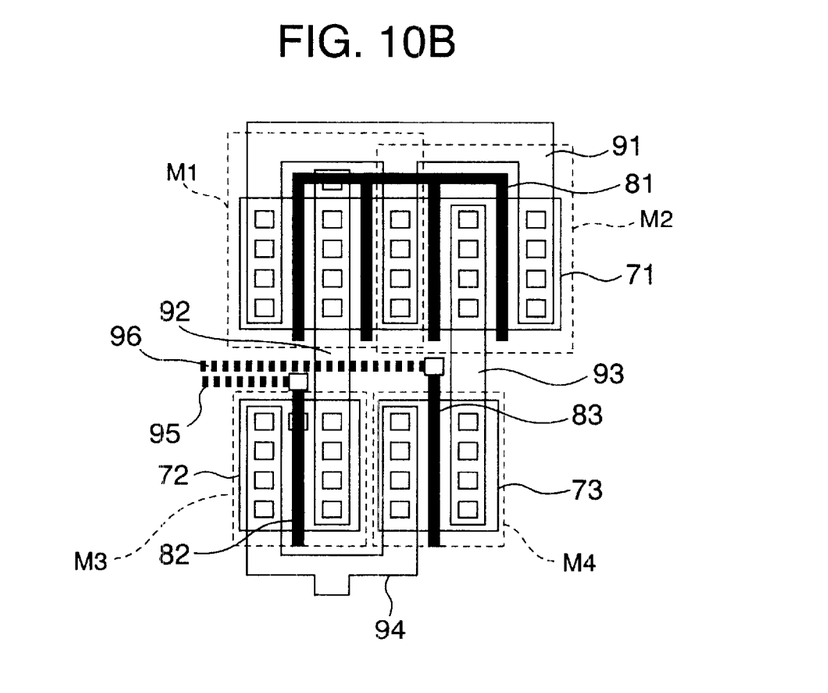

FIGS. 10A and 10B show an example of a MOS circuit and a layout of several elements of the MOS circuit, respectively. The circuit of FIG. 10A illustrates a general differential amplifier in which MOS transistors M1–M5 compose a differential amplifier stage and in which MOS transistors M7 and M8 compose an output stage. Reference symbols C2 and M6 denote an oscillation preventing capacitor and a MOS transistor acting as a resistor, respectively. In FIG. 10A, M1, M2 and M8 denote substantially paired matching MOS transistors. Each of groups M3 and M4, M5 and M7 is paired matching MOS transistors.

FIG. 10B illustrates circuit elements that comprise MOS transistors M1–M4 surrounded by a chained-line Y in FIG. 10A, and its wiring layout. In FIG. 10B, reference numeral 71 denotes a diffusion layer that forms the source and drain areas of the MOS transistors M1 and M2; 72 a diffusion layer that forms the source and drain areas of the MOS transistor M3; 73 a diffusion layer that forms the source and drain areas of the MOS transistor M4; 81 the respedtive gate electrodes of the MOS transistors M1 and M2; 82 the gate electrode of the MOS transistor M3; and 83 the gate electrode of the MOS transistor M4. The diffusion layers and gate electrodes are each made of a polysilicon layer.

Reference numeral 91 denotes a line made, for example, of aluminum that applies a power supply voltage Vcc to the source electrodes of the MOS transistors M1 and M2; 92 a line that interconnects the drain electrodes of the MOS transistors M1 and M3; 93 a line that interconnects the drain electrodes of the MOS transistors M2 and M4; 94 a line that interconnects the source electrodes of the MOS transistors M3 and M4; and 95 and 96 lines that interconnect the gate electrodes and input terminals IN and $\overline{\text{IN}}$ of the MOS transistors M3 and M4, respectively.

In this embodiment, the line 92 constitutes a net indicated by a thick line in FIG. 10A that interconnects the gates of the MOS transistors M1 and M2 and the drain electrode of the MOS transistor M3. The MOS circuit of FIG. 10B has no constraint of the midpoint interconnection ③. Thus, the line 92 is interconnected at a position deviating from the midpoint of the gate electrodes 81 of the MOS transistors M1 and M2. This is because no current flows into the gate electrode of each of the MOS transistors unlike the base electrodes of the bipolar transistors, and voltages at respective points on the gate electrode 81 are small and the required accuracis of the paired matching elements are satisfied even when they are not subjected to the midpoint interconnection.

Figure 11:
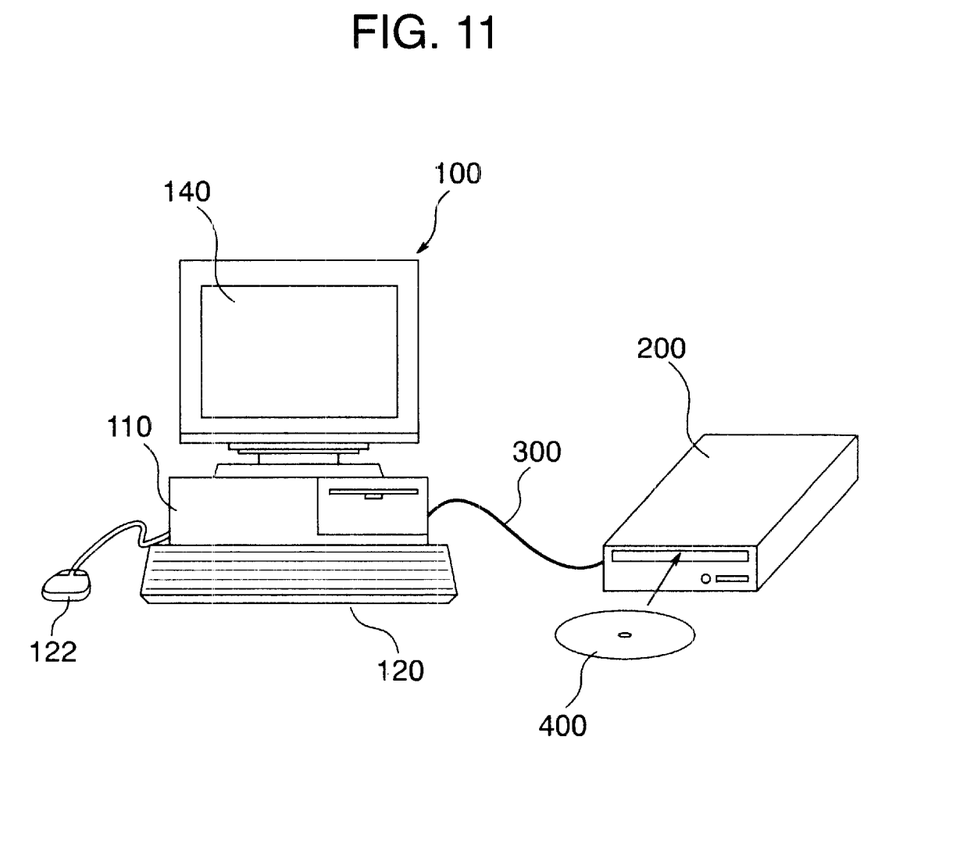
FIG. 11 is a block diagram of a system for executing the inventive route design method effectively.

FIG. 11 illustrates a system to which the inventive route design method is applied effectively. In FIG. 11, reference numeral 100 denotes a personal computer; and 200 an external storage device such as an optical disk driver or an additionally writable CD driver. The personal computer 100 comprises a computer proper 110, a keyboard 120 and a mouse 122 as input devices that input data to the computer proper 110, and a display 140 that displays, for example, a schematic whose data was input by the input devices.

In this system, the personal computer 100 is interconnected by a cable 300 to the external storage device 200 so that data is transferable by an interface such as ATAPI (AT Attachment Packet Interface) or a SCSI (Small Computer System Interface). The route design support program created by the present invention is stored in a medium 400 such as an optical or compact disc to be inserted into the external storage device 200. The personal computer 100 reads and executes the program to thereby perform the automatic routing design.

While in the above the present invention has been illustrated using its embodiment, the present invention is not limited to the embodiment. Various changes and modifications are possible without departing the spirit and scope of the present invention, of course. For example, in the above embodiment, when the constraint of the midpoint interconnection is generated depending on the required accuracy of the paired matching elements in the wiring constraint generating step S5, the midpoint of the subnet where currents flow is illustrated as being interconnected to the midpoint of the route of the subnet where no currents flow, as shown in FIG. 8C. In this case, at least the subnet where no currents flow or the subnet where the paired matching elements are present is only required to be midpoint-connected. The route may be determined so that the midpoint of the subnet where no currents flow is interconnected to any one of points on the subnet where currents flow. Even in doing so, the paired matching MOS transistors of FIG. 8 are supplied with the same base voltage to thereby avoid imbalance in dynamic characteristic.

While in the above description the application of the present invention to a designing system for semiconductor integrated circuits in the background of the invention has been illustrated, the present invention is applicable widely to designing electronic circuits, especially analog circuits, formed on a printed board, using a computer.

What is claimed is:

1. A method of designing a circuit comprising the steps of:
    inputting information on a schematic representing a circuit comprising a plurality of elements and a plurality of lines that interconnects respective terminals of the plurality of elements, and a value of a power supply voltage fed through a particular one of the plurality of lines that interconnects the respective terminals of the plurality of elements;
    detecting a path through which an electrical current flows in the circuit based on the inputted information on the schematic;
    extracting routing nets each of which comprises a route through which an electrical current flows from among routing nets each comprising at least one line that interconnects terminals of ones of the plurality of elements in electrical connecting relationship from the inputted information on the schematic;
    separating each of the extracted routing nets into a first subnet comprising a line through which an electrical current flows and a second subnet through which no electrical current flows; and
    creating a constraint condition by which a route is determined for each of said first and second subnets.

2. The method according to claim 1, wherein when the plurality of elements of the circuit comprise a bipolar transistor, said path detecting step is performed by assuming that no electrical current flows into the bipolar transistor through its base terminal.

3. The method according to claim 2, wherein when said first and second subnets are interconnected, said constraint condition generating step comprises generating a constraint condition that prevents a current, which would otherwise flow due to interconnection of the first and second subnets, from flowing through the second subnet.

4. The method according to claim 3, wherein said constraint condition is that the routes for said first and second subnets are free from overlapping with each other.

5. The method according to claim 1, wherein said schematic information inputting step comprises inputting data that specifies a pair of elements among the plurality of elements of the circuit, and wherein when a required accuracy of the circuit is high, said constraint condition generating step comprises interconnecting the route for the first subnet to a midpoint of the route for the second subnet that interconnects terminals of the pair of elements corresponding to each other.

6. The method according to claim 1, wherein said schematic data inputting step comprises inputting data specifying a pair of elements among the plurality of elements of the circuit and data specifying the accuracy of the pair of elements,
    wherein when accuracy of the pair of elements is inputted or when the inputted accuracy is higher than a predetermined value, said constraint condition generating step comprises connecting a midpoint of a line of said first subnet that interconnects the terminals of the pair of elements corresponding to each other with a line of another subnet.

7. The method according to claim 5, wherein the midpoint of the route for the subnet is at equal distances from a contact point where the route is interconnected to the first terminal and a contact point where the route is interconnected to the second terminal.

8. The method according to claim 1, wherein the circuit comprises an analog circuit that includes a bipolar transistor as an active element.

9. A program for supporting the design of a circuit comprising the functions of:

inputting information on a schematic representing a circuit comprising a plurality of elements, and a plurality of lines that interconnects respective terminals of the plurality of elements, and a value of a power supply voltage fed through a particular one of the plurality of lines that interconnects the respective terminals of the plurality of elements;

detecting a path through which an electrical current flows in the circuit based on the inputted information on the schematic;

extracting routing nets each of which comprises at least one route through which an electrical current flows from among routing nets each comprising at least one line that interconnects terminals of ones of the plurality of elements in electrical connecting relationship from the inputted information on the schematic;

separating the extracted routing nets into a first subnet comprising a route through which an electrical current flows and a second subnet comprising a route through which no electrical current flows; and creating a constraint condition by which a route is determined for each of said first and second subnets.

10. A computer readable recording medium that contains the circuit design supporting program of claim 9.

11. A circuit designing apparatus comprising:

a storage device in which the circuit design supporting program of claim 9 is stored;

a computer proper for reading the program from said storage device and for executing the program;

an input device for inputting required data to said computer proper; and a display device for displaying a schematic whose data is inputted by said input device.

12. A method of designing an electronic circuit, comprising the steps of:

analyzing an inputted and displayed schematic representing an electronic circuit that comprises a plurality of elements each having a terminal and a plurality of lines that each interconnect related ones of the terminals, and a value of a power supply voltage fed by a particular one of the plurality of lines;

producing a plurality of route nets each representing a line interconnecting terminals of the ones of the plurality of elements in electrical connecting relationship based on a result of the analysis of the schematic;

detecting paths of the electronic circuit where electrical currents flow, based on the result of the analysis of the schematic;

selecting a plurality of route nets each comprising a path through which an electrical current flows and at least four terminals based on the produced plurality of route nets and paths, and separating each of the selected plurality of route nets into a first subnet of lines through which electrical currents flow and a second subnet of lines through which no electrical currents flow;

determining routes for the first and second subnets by regarding the first and second subnets as separate nets; and interconnecting points on the routes for said first and second subnets.

13. The method according to claim 12, wherein the points on the routes for said first and second subnets are interconnected by another route.

14. The method according to claim 12, wherein the route for said first subnet intersects at one point with the route for said second subnet.

15. A computer executable program for supporting the design of an electronic circuit, comprising the steps of:

analyzing an inputted and displayed schematic representing an electronic circuit that comprises a plurality of elements each having a terminal and a plurality of lines that each interconnect related ones of the terminals, and a value of a power supply voltage fed by a particular one of the plurality of lines;

producing a plurality of route nets each representing a line interconnecting terminals of the ones of the plurality of elements in electrical connecting relationship based on a result of the analysis of the schematic;

detecting paths of the electronic circuit where electronic currents flow, based on the result of the analysis of the schematic;

selecting a plurality of route nets each comprising a path through which an electrical current flows and at least four terminals based on the produced plurality of route nets and paths, and separating each of the selected plurality of route nets into a first subnet of lines through which electrical currents flow and a second subnet of lines through which no electrical currents flow;

determining routes for the first and second subnets by regarding the first and second subnets as separate nets; and interconnecting points on the routes for said first and second subnets.

16. A computer readable recording medium that contains the circuit design supporting program of claim 15.

* * * * *